(12) United States Patent
Yi et al.

(10) Patent No.: US 10,743,337 B2
(45) Date of Patent: Aug. 11, 2020

(54) METHOD AND APPARATUS FOR DESIGNING DOWNLINK CONTROL INFORMATION FOR SHORT TTI IN WIRELESS COMMUNICATION SYSTEM

(71) Applicant: LG ELECTRONICS INC., Seoul (KR)

(72) Inventors: Yunjung Yi, Seoul (KR); Eunsun Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 15/771,226

(22) PCT Filed: Oct. 31, 2016

(86) PCT No.: PCT/KR2016/012390
§ 371 (c)(1),
(2) Date: Apr. 26, 2018

(87) PCT Pub. No.: WO2017/074156
PCT Pub. Date: May 4, 2017

(65) Prior Publication Data
US 2018/0317250 A1 Nov. 1, 2018

Related U.S. Application Data

(60) Provisional application No. 62/248,299, filed on Oct. 30, 2015.

(51) Int. Cl.
*H04W 72/04* (2009.01)
*H04W 72/12* (2009.01)
(Continued)

(52) U.S. Cl.
CPC ......... *H04W 72/1289* (2013.01); *H04L 5/001* (2013.01); *H04L 5/0044* (2013.01);
(Continued)

(58) Field of Classification Search
CPC .. H04L 5/00; H04W 72/0446; H04W 72/1289
(Continued)

(56) References Cited

U.S. PATENT DOCUMENTS

2011/0195732 A1\* 8/2011 Kim ............... H04L 5/0037
455/509
2013/0010714 A1\* 1/2013 Kim ............... H04L 1/0038
370/329
(Continued)

FOREIGN PATENT DOCUMENTS

WO 2014124164 8/2014
WO WO-2014124164 A1 \* 8/2014 ........ H04W 72/1263

OTHER PUBLICATIONS

Davide Catania, et al., "The Potential of Flexible UL/DL Slot Assignment in 5G Systems," 2014 IEEE 80th Vehicular Technology Conference (VTC Fall), Sep. 14-17, 2014, see pp. 2-4.

*Primary Examiner* — Melvin C Marcelo
*Assistant Examiner* — Natali Pascual Peguero
(74) *Attorney, Agent, or Firm* — Dentons US LLP

(57) ABSTRACT

A method and apparatus for receiving a physical downlink shared channel (PDSCH) for a short transmission time interval (TTI) in a wireless communication system is provided. A user equipment (UE) receives a downlink control information (DCI) format, which schedules the PDSCH for the short TTI in at least one group of bandwidths among an entire system bandwidth, from an eNodeB (eNB), and receives the PDSCH for the short TTI in the at least one group of bandwidth from the eNB. A length of the short TTI is less than 1 ms.

20 Claims, 7 Drawing Sheets

(51) Int. Cl.
  *H04L 5/00* (2006.01)
  *H04L 5/14* (2006.01)
(52) U.S. Cl.
  CPC .......... *H04L 5/0082* (2013.01); *H04L 5/0092* (2013.01); *H04W 72/0446* (2013.01); *H04L 5/0023* (2013.01); *H04L 5/0064* (2013.01); *H04L 5/14* (2013.01)
(58) Field of Classification Search
  USPC .................................................. 370/254, 329
  See application file for complete search history.

(56) References Cited

U.S. PATENT DOCUMENTS

2015/0016431 A1   1/2015  Ranta-Aho et al.
2018/0287742 A1*  10/2018 Feng .................... H04L 1/1812

* cited by examiner

METHOD AND APPARATUS FOR DESIGNING DOWNLINK CONTROL INFORMATION FOR SHORT TTI IN WIRELESS COMMUNICATION SYSTEM

CROSS-REFERENCE TO RELATED APPLICATIONS

This application is the National Stage filing under 35 U.S.C. 371 of International Application No. PCT/KR2016/012390, filed on Oct. 31, 2016, which claims the benefit of U.S. Provisional Application No. 62/248,299 filed on Oct. 30, 2015, the contents of which are all hereby incorporated by reference herein in their entirety.

BACKGROUND OF THE INVENTION

Field of the Invention

The present invention relates to wireless communications, and more particularly, to a method and apparatus for designing downlink control information (DCI) for a short transmission time interval (TTI) in a wireless communication system.

Related Art

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Packet data latency is one of the performance metrics that vendors, operators and also end-users (via speed test applications) regularly measure. Latency measurements are done in all phases of a radio access network system lifetime, when verifying a new software release or system component, when deploying a system and when the system is in commercial operation. Better latency than previous generations of 3GPP radio access technologies (RATs) was one performance metric that guided the design of LTE. LTE is also now recognized by the end-users to be a system that provides faster access to internet and lower data latencies than previous generations of mobile radio technologies. In the 3GPP, much effort has been put into increasing data rates from the first release of LTE (Rel-8) until the most recent one (Rel-12). However, with regard to further improvements specifically targeting the delays in the system little has been done.

Packet data latency is important not only for the perceived responsiveness of the system, but it is also a parameter that indirectly influences the throughput. In addition, to achieve really high bit rates, UE L2 buffers need to be dimensioned correspondingly. The longer the round trip time (RTT) is, the bigger the buffers need to be. The only way to reduce buffering requirements in the UE and eNB side is to reduce latency. Further, radio resource efficiency could also be positively impacted by latency reductions. Lower packet data latency could increase the number of transmission attempts possible within a certain delay bound, hence higher block error rate (BLER) targets could be used for the data transmissions, freeing up radio resources but still keeping the same level of robustness for users in poor radio conditions. The increased number of possible transmissions within a certain delay bound, could also translate into more robust transmissions of real-time data streams (e.g. voice over LTE (VoLTE)), if keeping the same BLER target. This may improve the VoLTE voice system capacity.

Various pre-scheduling strategies can be used to lower the latency to some extent, but similarly to shorter scheduling request (SR) interval introduced in Rel-9, they do not necessarily address all efficiency aspects. Accordingly, various techniques to reduce latency have been discussed. Specifically, as for one of techniques to reduce latency, a short transmission time interval (TTI) has been discussed.

SUMMARY OF THE INVENTION

The present invention provides a method and apparatus for designing downlink control information (DCI) for a short transmission time interval (TTI) in a wireless communication system. The present invention discusses DCI format, DCI content and/or resource allocation mechanisms to reduce control overhead when short TTI is used coexisting with legacy TTI scheduling.

In an aspect, a method for receiving a physical downlink shared channel (PDSCH) for a short transmission time interval (TTI) by a user equipment (UE) in a wireless communication system is provided. The method includes receiving a downlink control information (DCI) format, which schedules the PDSCH for the short TTI in at least one group of bandwidths among an entire system bandwidth, from an eNodeB (eNB), and receiving the PDSCH for the short TTI in the at least one group of bandwidth from the eNB. A length of the short TTI is less than 1 ms.

In another aspect, a user equipment (UE) in a wireless communication system is provided. The UE includes a memory, a transceiver, and a processor, coupled to the memory and the transceiver, that controls the transceiver to receive a downlink control information (DCI) format, which schedules a physical downlink shared channel (PDSCH) for a short transmission time interval (TTI) in at least one group of bandwidths among an entire system bandwidth, from an eNodeB (eNB), and controls the transceiver to receive the PDSCH for the short TTI in the at least one group of bandwidth from the eNB. A length of the short TTI is less than 1 ms.

A short TTI can be supported more efficiently.

DESCRIPTION OF EXEMPLARY EMBODIMENTS

Techniques, apparatus and systems described herein may be used in various wireless access technologies such as code division multiple access (CDMA), frequency division multiple access (FDMA), time division multiple access (TDMA), orthogonal frequency division multiple access (OFDMA), single carrier frequency division multiple access (SC-FDMA), etc. The CDMA may be implemented with a radio technology such as universal terrestrial radio access (UTRA) or CDMA2000. The TDMA may be implemented with a radio technology such as global system for mobile communications (GSM)/general packet radio service (GPRS)/enhanced data rates for GSM evolution (EDGE). The OFDMA may be implemented with a radio technology such as institute of electrical and electronics engineers (IEEE) 802.11 (Wi-Fi), IEEE 802.16 (WiMAX), IEEE 802-20, evolved-UTRA (E-UTRA) etc. The UTRA is a part of a universal mobile telecommunication system (UMTS). 3rd generation partnership project (3GPP) long term evolution (LTE) is a part of an evolved-UMTS (E-UMTS) using the E-UTRA. The 3GPP LTE employs the OFDMA in downlink (DL) and employs the SC-FDMA in uplink (UL). LTE-advance (LTE-A) is an evolution of the 3GPP LTE. For clarity, this application focuses on the 3GPP LTE/LTE-A. However, technical features of the present invention are not limited thereto.

Figure 1:
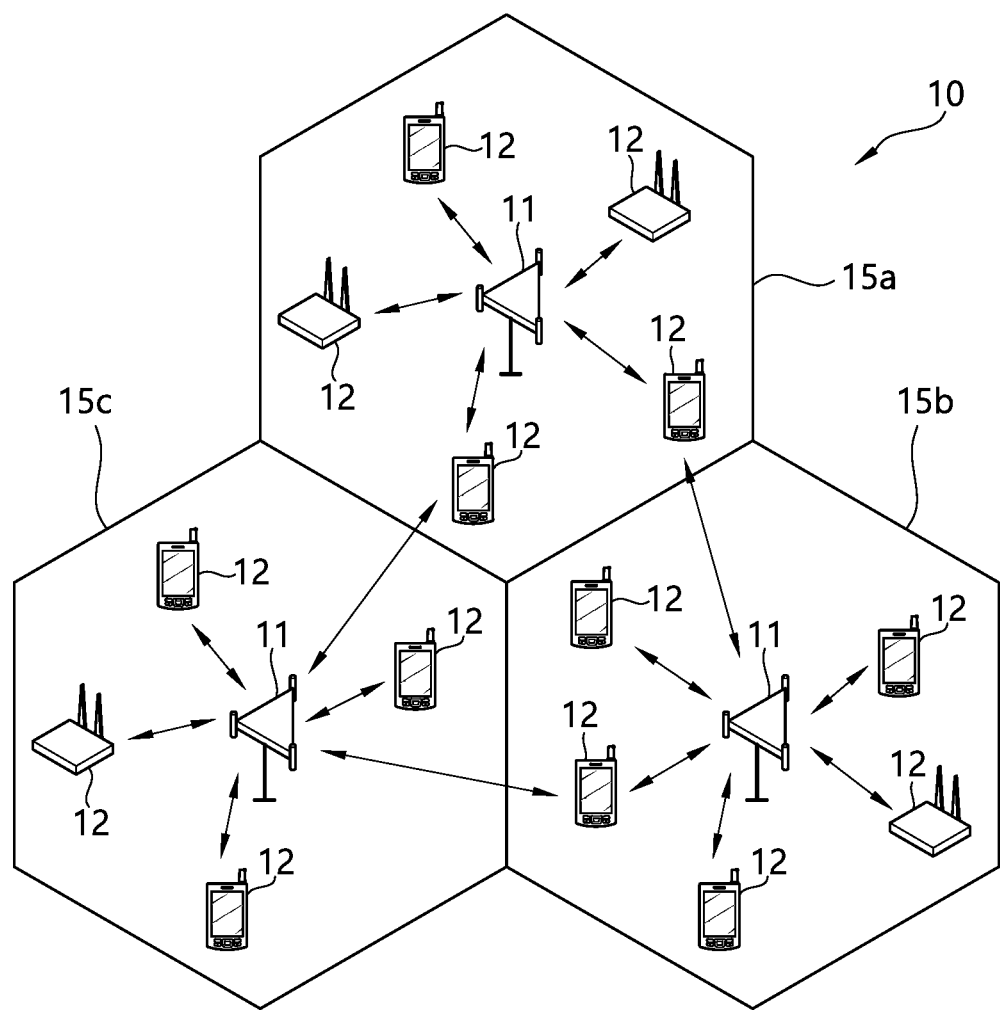
FIG. 1 shows a wireless communication system.

FIG. 1 shows a wireless communication system. The wireless communication system 10 includes at least one evolved NodeB (eNB) 11. Respective eNBs 11 provide a communication service to particular geographical areas 15a, 15b, and 15c (which are generally called cells). Each cell may be divided into a plurality of areas (which are called sectors). A user equipment (UE) 12 may be fixed or mobile and may be referred to by other names such as mobile station (MS), mobile terminal (MT), user terminal (UT), subscriber station (SS), wireless device, personal digital assistant (PDA), wireless modem, handheld device. The eNB 11 generally refers to a fixed station that communicates with the UE 12 and may be called by other names such as base station (BS), base transceiver system (BTS), access point (AP), etc.

In general, a UE belongs to one cell, and the cell to which a UE belongs is called a serving cell. An eNB providing a communication service to the serving cell is called a serving eNB. The wireless communication system is a cellular system, so a different cell adjacent to the serving cell exists. The different cell adjacent to the serving cell is called a neighbor cell. An eNB providing a communication service to the neighbor cell is called a neighbor eNB. The serving cell and the neighbor cell are relatively determined based on a UE.

This technique can be used for DL or UL. In general, DL refers to communication from the eNB 11 to the UE 12, and UL refers to communication from the UE 12 to the eNB 11. In DL, a transmitter may be part of the eNB 11 and a receiver may be part of the UE 12. In UL, a transmitter may be part of the UE 12 and a receiver may be part of the eNB 11.

The wireless communication system may be any one of a multiple-input multiple-output (MIMO) system, a multiple-input single-output (MISO) system, a single-input single-output (SISO) system, and a single-input multiple-output (SIMO) system. The MIMO system uses a plurality of transmission antennas and a plurality of reception antennas. The MISO system uses a plurality of transmission antennas and a single reception antenna. The SISO system uses a single transmission antenna and a single reception antenna. The SIMO system uses a single transmission antenna and a plurality of reception antennas. Hereinafter, a transmission antenna refers to a physical or logical antenna used for transmitting a signal or a stream, and a reception antenna refers to a physical or logical antenna used for receiving a signal or a stream.

Figure 2:
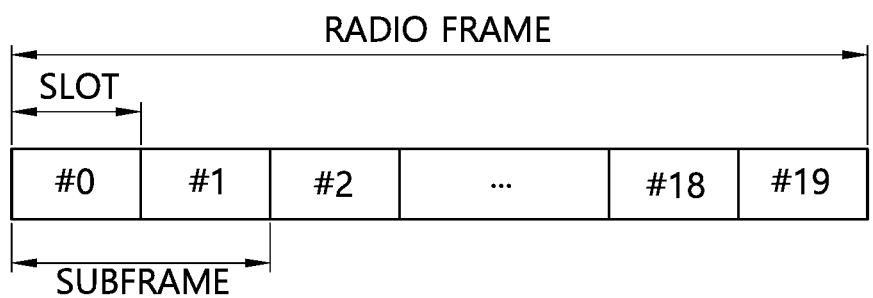
FIG. 2 shows structure of a radio frame of 3GPP LTE.

FIG. 2 shows structure of a radio frame of 3GPP LTE. Referring to FIG. 2, a radio frame includes 10 subframes. A subframe includes two slots in time domain. A time for transmitting one transport block by higher layer to physical layer (generally over one subframe) is defined as a transmission time interval (TTI). For example, one subframe may have a length of 1 ms, and one slot may have a length of 0.5 ms. One slot includes a plurality of orthogonal frequency division multiplexing (OFDM) symbols in time domain. Since the 3GPP LTE uses the OFDMA in the DL, the OFDM symbol is for representing one symbol period. The OFDM symbols may be called by other names depending on a multiple-access scheme. For example, when SC-FDMA is in use as a UL multi-access scheme, the OFDM symbols may be called SC-FDMA symbols. A resource block (RB) is a resource allocation unit, and includes a plurality of contiguous subcarriers in one slot. The structure of the radio frame is shown for exemplary purposes only. Thus, the number of subframes included in the radio frame or the number of slots included in the subframe or the number of OFDM symbols included in the slot may be modified in various manners.

The wireless communication system may be divided into a frequency division duplex (FDD) scheme and a time division duplex (TDD) scheme. According to the FDD scheme, UL transmission and DL transmission are made at different frequency bands. According to the TDD scheme, UL transmission and DL transmission are made during different periods of time at the same frequency band. A channel response of the TDD scheme is substantially reciprocal. This means that a DL channel response and a UL channel response are almost the same in a given frequency band. Thus, the TDD-based wireless communication system is advantageous in that the DL channel response can be obtained from the UL channel response. In the TDD scheme, the entire frequency band is time-divided for UL and DL transmissions, so a DL transmission by the eNB and a UL transmission by the UE cannot be simultaneously performed. In a TDD system in which a UL transmission and a DL transmission are discriminated in units of subframes, the UL transmission and the DL transmission are performed in different subframes. In a TDD system, to allow fast switching between DL and UL, UL and DL transmission may be performed within a same subframe/slot in time division multiplexing (TDM)/frequency division multiplexing (FDM) manner.

Figure 3:
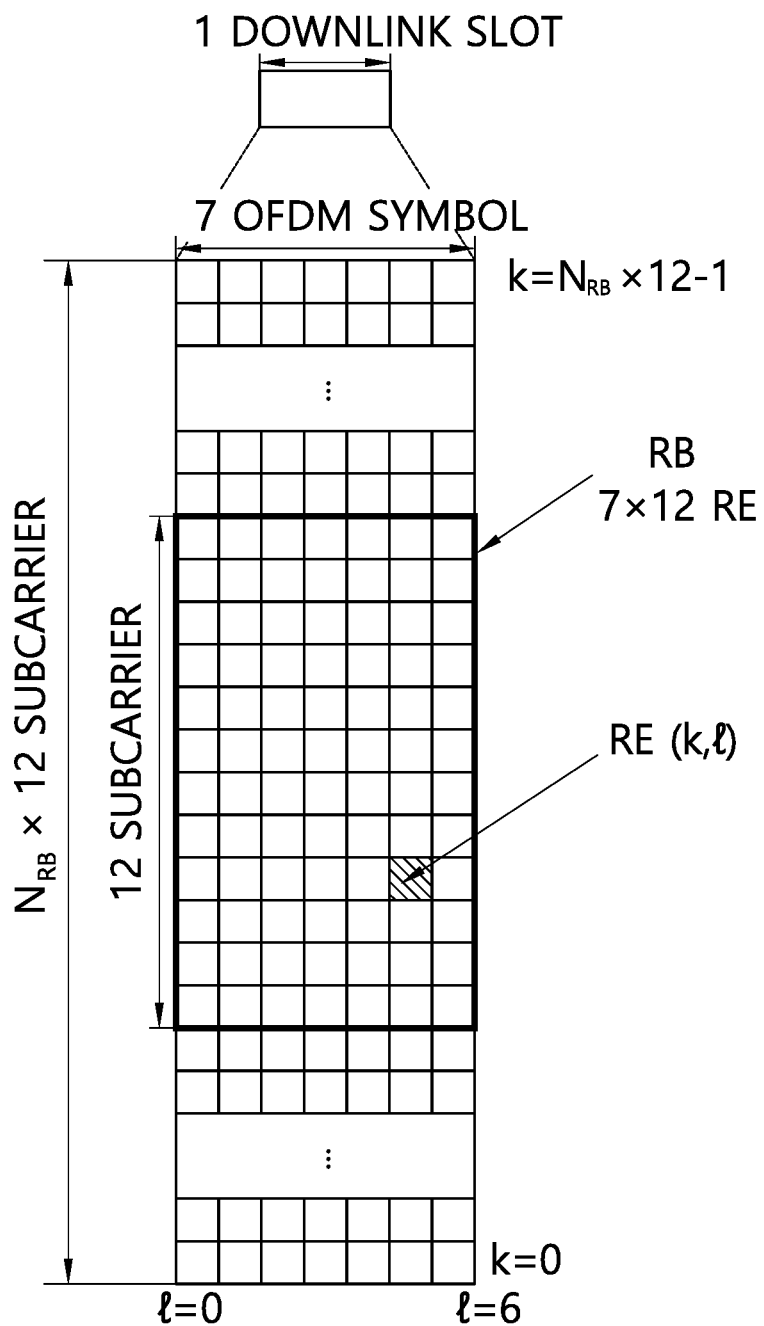
FIG. 3 shows a resource grid for one downlink slot.

FIG. 3 shows a resource grid for one downlink slot. Referring to FIG. 3, a DL slot includes a plurality of OFDM symbols in time domain. It is described herein that one DL slot includes 7 OFDM symbols, and one RB includes 12 subcarriers in frequency domain as an example. However, the present invention is not limited thereto. Each element on the resource grid is referred to as a resource element (RE). One RB includes 12×7 or 12×14 resource elements. The number $N^{DL}$ of RBs included in the DL slot depends on a DL transmit bandwidth. The structure of a UL slot may be same as that of the DL slot. The number of OFDM symbols and the number of subcarriers may vary depending on the length of a CP, frequency spacing, etc. For example, in case of a normal cyclic prefix (CP), the number of OFDM symbols is 7 or 14, and in case of an extended CP, the number of OFDM symbols is 6 or 12. One of 128, 256, 512, 1024, 1536, and 2048 may be selectively used as the number of subcarriers in one OFDM symbol.

Figure 4:
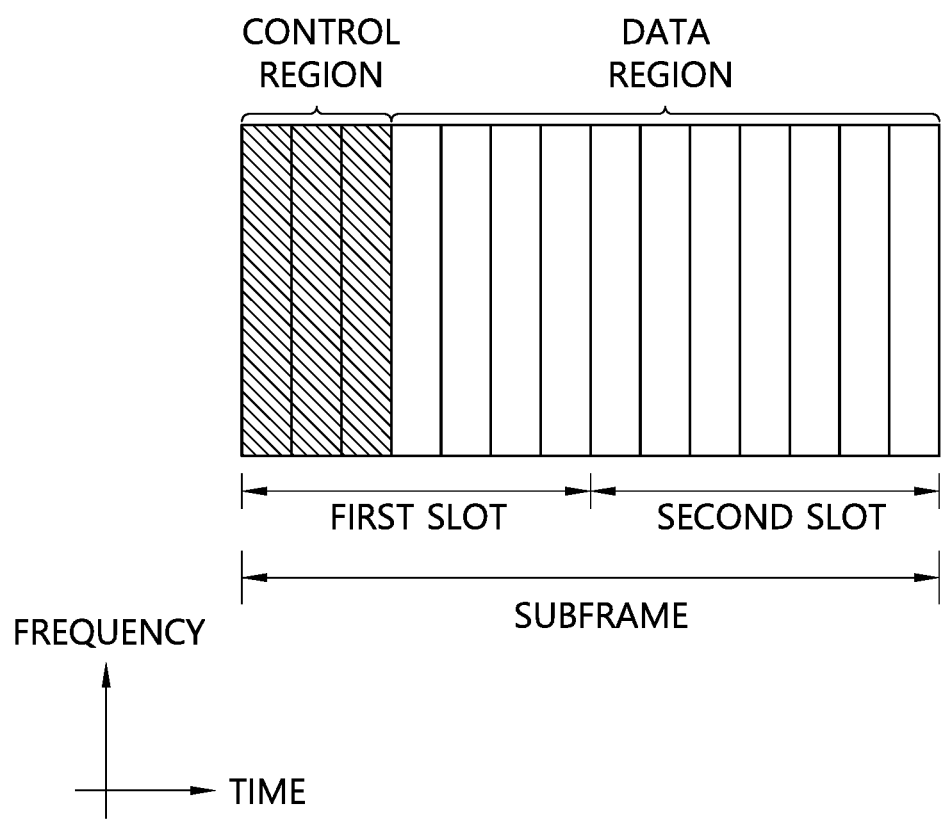
FIG. 4 shows structure of a downlink subframe.

FIG. 4 shows structure of a downlink subframe. Referring to FIG. 4, a maximum of three OFDM symbols located in a front portion of a first slot within a subframe correspond to a control region to be assigned with a control channel. The remaining OFDM symbols correspond to a data region to be assigned with a physical downlink shared chancel (PDSCH). Examples of DL control channels used in the 3GPP LTE includes a physical control format indicator channel (PCFICH), a physical downlink control channel (PDCCH), a physical hybrid automatic repeat request (HARQ) indicator channel (PHICH), etc. The PCFICH is transmitted at a first OFDM symbol of a subframe and carries information regarding the number of OFDM symbols used for transmission of control channels within the subframe. The PHICH is a response of UL transmission and carries a HARQ acknowledgment (ACK)/non-acknowledgment (NACK) signal. Control information transmitted through the PDCCH is referred to as downlink control information (DCI). The DCI includes UL or DL scheduling information or includes a UL transmit (TX) power control command for arbitrary UE groups.

The PDCCH may carry a transport format and a resource allocation of a downlink shared channel (DL-SCH), resource allocation information of an uplink shared channel (UL-SCH), paging information on a paging channel (PCH), system information on the DL-SCH, a resource allocation of an upper-layer control message such as a random access response transmitted on the PDSCH, a set of TX power control commands on individual UEs within an arbitrary UE group, a TX power control command, activation of a voice over IP (VoIP), etc. A plurality of PDCCHs can be transmitted within a control region. The UE can monitor the plurality of PDCCHs. The PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups.

Figure 5:
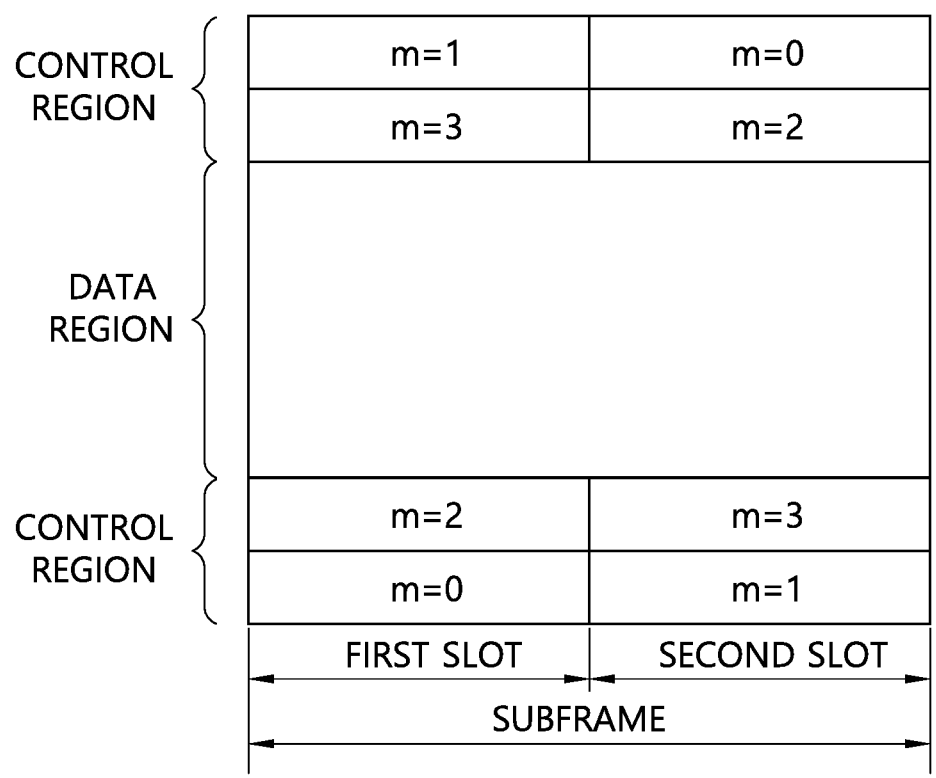
FIG. 5 shows structure of an uplink subframe.

FIG. 5 shows structure of an uplink subframe. Referring to FIG. 5, a UL subframe can be divided in a frequency domain into a control region and a data region. The control region is allocated with a physical uplink control channel (PUCCH) for carrying UL control information. The data region is allocated with a physical uplink shared channel (PUSCH) for carrying user data. When indicated by a higher layer, the UE may support a simultaneous transmission of the PUSCH and the PUCCH. The PUCCH for one UE is allocated to an RB pair in a subframe. RBs belonging to the RB pair occupy different subcarriers in respective two slots. This is called that the RB pair allocated to the PUCCH is frequency-hopped in a slot boundary. This is said that the pair of RBs allocated to the PUCCH is frequency-hopped at the slot boundary. The UE can obtain a frequency diversity gain by transmitting UL control information through different subcarriers according to time.

UL control information transmitted on the PUCCH may include a HARQ ACK/NACK, a channel quality indicator (CQI) indicating the state of a DL channel, a scheduling request (SR), and the like. The PUSCH is mapped to a UL-SCH, a transport channel. UL data transmitted on the PUSCH may be a transport block, a data block for the UL-SCH transmitted during the TTI. The transport block may be user information. Or, the UL data may be multiplexed data. The multiplexed data may be data obtained by multiplexing the transport block for the UL-SCH and control information. For example, control information multiplexed to data may include a CQI, a precoding matrix indicator (PMI), an HARQ, a rank indicator (RI), or the like. Or the UL data may include only control information.

In an LTE system, there are multiple components contributing to the total end to end delay for connected UEs. The limitations in performance are in general use case dependent, for which, e.g. UL latency may influence the DL application performance and vice versa. Examples of sources to latency are listed below.

(1) Grant acquisition: A UE with data to send must send a SR and receive a scheduling grant before transmitting the data packet. In order to send a SR, it must wait for a SR-valid PUCCH resource and a corresponding scheduling grant transmitted to the UE in response. When the grant is decoded the data transmission can start over PUSCH.

(2) Random access: If the UL timing of a UE is not aligned, initial time alignment is acquired with the random access procedure. The time alignment can be maintained with timing advance commands from the eNB to the UE. However, it may be desirable to stop the maintenance of UL time alignment after a period of inactivity, thus the duration of the random access procedure may contribute to the overall latency in RRC_CONNECTED. The random access procedure also serves as an UL grant acquisition mechanism (random access based scheduling request). Therefore, for cases where random access is needed, no separate PUCCH based SR procedure/step is needed.

(3) TTI: The transmission of a request, grant, or data is done in subframe chunks with a fixed duration (1 ms), which is the source of a delay per packet exchange between the UE and the eNB.

(4) Processing: Data and control need to be processed (e.g. encoded and decoded) in the UE and eNB. Data processing is a source of processing delays, which are proportional to the transport block (TB) size. The processing of control information is typically less dependent on TB size.

(5) HARQ round trip time (RTT): For UL transmission in FDD, the HARQ ACK for a packet received by the eNB in subframe n is reported in subframe n+4. If a retransmission is needed by the UE, this is done in subframe n+8. Thus, the HARQ RTT is 8 ms for FDD UL. For TDD, RTT depends on TDD configuration. The RTT for DL transmissions is not specified in detail, as the HARQ scheme is asynchronous. The HARQ feedback is available at subframe n+4 in FDD, and retransmissions can typically be scheduled in subframe n+8 or later if needed.

(6) Core/Internet: In the core network, packets can be queued due to congestion and delayed due to transmission over backhaul links. Internet connections can be congested and therefore add to the experienced end-to-end packet delay. EPC and/or Internet delays vary widely. In the context of latency reductions, it is reasonable to assume that latency performance of the transport links is good.

For example, Table 1 shows a typical radio access latency components for a UL transmission from a UE without a valid UL grant.

TABLE 1

| Component | Description | Time (ms) |
|---|---|---|
| 1 | Average waiting time for PUCCH (0 ms SR period/1 ms SR period) | 5/0.5 |
| 2 | UE sends SR on PUCCH | 1 |
| 3 | eNB decodes SR and generates the scheduling grant | 3 |
| 4 | Transmission of scheduling grant | 1 |
| 5 | UE processing delay (decoding of scheduling grant + L1 encoding of UL data) | 3 |

TABLE 1-continued

| Component | Description | Time (ms) |
|---|---|---|
| 6 | Transmission of UL data | 1 |
| 7 | Data decoding in eNB | 3 |
| | Total delay (ms) | 17/12.5 |

Referring to Table 1, assuming Rel-8 functionality, the average waiting time for a PUCCH at a periodicity of 10 ms is 5 ms, leading to a radio access latency sum of 17 ms. With a SR period set to 1 ms, the average waiting time is reduced to 0.5 ms, which would lead to a sum of 12.5 ms.

Table 2 shows a typical radio access latency components for a DL transmission.

TABLE 2

| Component | Description | Time (ms) |
|---|---|---|
| 1 | Processing incoming data | 3 |
| 2 | TTI alignment | 0.5 |
| 3 | Transmission of DL data | 1 |
| 4 | Data decoding in UE | 3 |
| | Total delay (ms) | 7.5 |

From the tables, it can be seen that grant acquisition delay, transmission and data processing times are additive.

In order to reduce latency, short TTI which may be shorter than current TTI (i.e. 1 ms) has been considered. For example, length of short TTI may be one of 1/2/3/4/7 symbols. When a short TTI is introduced for latency reduction in LTE, E-UTRAN may be configured with both normal TTI with 1 ms and short TTI with a value less than 1 ms, such as 1 symbol or 0.5 ms. With keeping the current LTE frame structure, OFDM symbol length, subcarrier spacing, etc., reduction of TTI generally means smaller transport block size (TBS) contained in one TTI, and relatively larger control overhead if DCI size is kept as the same.

When short TTI is adopted, and as a result, the number of OFDM symbols in reduced in one TTI (e.g. from 14 to 2) or subcarrier spacing increases (e.g. from 15 kHz to 60 kHz), a RB size may be different from the current RB size. For example, with subcarrier spacing of 60 kHz, one RB may include 12×8 resource elements, instead of 12×14 resource elements. For another example, when TTI length is 2 OFDM symbol length, one RB may include 12×2 resource elements. If short TTI is used, particularly with smaller number of OFDM symbols, larger RB size in frequency domain may be considered (e.g. one RB includes 48×2 resource elements).

Since short TTI tends to lead higher performance only in some cases, such as small transmission control packet (TCP) size, short file size, low load condition, etc., coexistence of the short TTI and the long TTI (or, legacy TTI) may be preferred. In other words, short TTI may not be used regardless of scenarios, unless one short TTI size is the size that the network only supports. If the network supports multiple TTI sizes, it may be also beneficial that the advanced UEs also support multiple TTI sizes. Moreover, supporting multiple TTI sizes at the same time may be more appropriate to handle different multiplexed scenarios/applications. In order to maximize the benefit of short TTI, it is desirable to minimize control overhead. A certain set of features may be only enabled when rather long TTI is used. Regardless of TTI size, it is desirable to maintain the same overhead of control signaling. Control signaling may include DCI overhead, reference signal (RS) overhead, etc.

When different size of TTI can be dynamically or semi-statically configured to a UE, the number of candidate TTI sizes may be more than two.

The coexistence of the short TTI and the long TTI may be necessary at least to support short TTI unicast transmission and long TTI broadcast transmission. Hereinafter, various features for supporting the coexistence of the short TTI and the long TTI will be described according to embodiments of the present invention. The short TTI may refer TTI whose size is short than the long TTI. The long TTI may refer TTI whose size is longer than the short TTI. The long TTI may be the same as the legacy TTI (i.e. 1 ms).

1. DCI Format Used for Short TTI Data Scheduling.

In order to reduce control overhead, the size of DCI may be minimized. For this, compact DCI, such as DCI format 1C, may be used. The field included in DCI format 1C is as follows.

gap indication: 1 bit

Resource block assignment (virtual RB based contiguous resource allocation mechanism—type 2): In case of about 49 PRBs, the size of resource block assignment may be 7-8 bits.

Modulation and coding scheme (MCS): 5 bits.

In total, DCI format 1C may require 13-14 bits. However, according to resource allocation by DCI format 1C, resource blocks across the entire system bandwidth are distributed using distributed resource allocation based on virtual PRB mapping. If short TTI PDSCH is multiplexed with either short TTI scheduling DCI and/or long TTI PDSCH, in order to allow multiplexing of short TTI PDSCH with short TTI scheduling DCI and/or long TTI PDSCH, at least one of the following options may be considered.

(1) Virtual PRB mapping function may occur based on legacy function. In other words, virtual PRB mapping to physical PRB mapping may change in every slot following the legacy TTI. If a short TTI occurs over two legacy slots, this option may not work. In this case, the resource mapping overlapping with the first legacy slot may follow first slot mapping, and the resource mapping overlapping with the second legacy slot may follow the second slot mapping. If this option is used, resource mapping of short TTI control may follow virtual PRB mapping. In other words, the resource allocation on short TTI control region may be based on the virtual PRB mapping. When distributed resource mapping or virtual PRB is used for resource allocation, the virtual PRB mapping may be determined by long TTI slot boundary. Furthermore, whether to follow legacy TTI/slot boundary for distributed resource block determination or short TTI/slot boundary may be configured by higher layer.

(2) The bandwidth used by a short TTI PDSCH may be restricted. For example, a UE may be configured semi-statically the bandwidth where resource allocation for short TTI PDSCH by DCI format 1C can be applied. That is, instead that DCI format 1C is applied to the entire system bandwidth, bandwidth may be semi-statically configured for short TTI PDSCH. This bandwidth may be non-contiguous or contiguous. The configuration of the bandwidth for short TTI PDSCH may be cell-specific such that it may be forwarded/broadcasted in a system information. Based on the configuration, all DCI formats scheduling short TTI PDSCH may be adapted for the configuration. In this case, even with distributed resource allocation, data may be mapped to a subset of PRBs rather than the entire PRBs in the system bandwidth. This also may reduce the overall size of resource allocation field in DCI format.

The configuration of the bandwidth may be dynamic. For example, the entire system bandwidth may be divided into a few small bandwidth groups, and one or more groups used for resource allocation/mapping for short TTI PDSCH may be dynamically indicated by DCI format. The bandwidth groups may be implicitly determined based on user ID, or cell radio network temporary identifier (C-RNTI), or scrambling code, etc. In terms of dynamic change of number of small bandwidth groups used by short TTI PDSCH, a few bits of indication of bandwidth group may be used. For example, different enhanced PDCCH (EPDCCH) set which can schedule different set of bandwidth groups via resource allocation may be used. In other words, EPDCCH set may also include possible PRBs usable by PDSCH resource allocation via DCI format scheduled by the EPDCCH set. For another example, the set of bandwidth groups may be mapped to candidate index where DCI format is transmitted. In general, implicit association with search space scheduling control channel (regardless of EPDCCH or PDCCH) may be considered.

(3) The Collision May be Left Up to Network.

For MIMO configuration, separate DCIs may be scheduled. Even with a single transmission mode (TM) configured to a UE with short TTI, it may be possible that two different DCI sizes may be used for MIMO functionalities depending on the TTI size used for data scheduling. For example, short TTI may not assume MIMO (and thus DCI size may be smaller), whereas long TTI may assume MIMO (if the configured TM supports MIMO). Also, TM may be configured per UE, regardless of TTI size used for PDSCH (or PUSCH) scheduling. Alternatively, different TM may be configured per TTI, and accordingly, different DCI formats/sizes may be configured per TTI. If content included in DCI format changes by TTI size, the mapping may be predefined in the specification. For example, in TM 1/2, DCI format 1C may correspond to OFDM symbols of 1 to 6 and DCI format 1A may correspond to OFDM symbols of 7 to 14. In TM 3/4, DCI format 1C may correspond to OFDM symbols of 1 to 6 and DCI format 1 may correspond to OFDM symbols of 7 to 14. Or, the mapping may be configured per each TTI size via higher layer signaling. Instead of TM, transmission may be configured per TTI, which then may define the DCI field/format/contents. Further, higher layer configuration of TM per TTI size may offer flexibility.

If a UE can blind detect two different DCI sizes, to support short TTI, two different DCI sizes may be blindly detected by the UE even with the same TTI size. Compact DCI may be used, and a few fields may be shortened or have default values if not signaled. If full information needs to be signaled, long DCI size may be used. In terms of compact DCI, for the fields not signaled, it may be assumed that either there are default values (either configured or prefixed) or values signaled via the most recent full DCI is used.

(4) No Cyclic Redundancy Check (CRC) in DCI for Short TTI

Instead of CRC which adds considerable overhead, short size UE ID or a number may be added to CRC or in the payload of DCI. The short size UE ID or the number may be assigned semi-statically or assigned by the first level DCI which may be carried over legacy PDCCH or another control channel. If legacy PDCCH configures the short size UE ID or a number, it may be valid within a subframe or until different number is dynamically indicated. In other words, short CRC ID can be semi-statically or dynamically indicated by the first level DCI.

(5) Preconfigured Resource Allocation

Another approach is to reduce DCI size is to preconfigure a set of resource allocation fields, and indicate only index or necessary information to make full resource allocation. For example, a short TTI frequency region may be configured semi-statically, and the number of UEs sharing the configured short TTI region may be indicated dynamically along with the index among the scheduled UEs. Equally divided resource blocks within the configured short TTI region may be assigned to each UE following the index. If there is only one UE for short TTI, all the configured resource may be used for that single UE. For another example, full bandwidth may be used for short TTI operation UEs, and legacy or long TTI may consume data blocks from the lowest and highest PRBs. In this case, equal number of PRBs in both sides may be used. Start of short TTI region and/or the number of UEs in the short TTI region may be dynamically indicated. The UE may selects its resource based on UE ID. Additionally, offset value may be dynamically indicated (1 or 2 bits), which may be added to the resource block determined by UE ID. For example, if there are two short TTI UEs, (UE ID % 2) may be used to select the first resource blocks or second resource blocks. If UE IDs collide with each other (e.g. both are even), additional offset may be used.

2. Hierarchical DCI Used for Multiple Short TTIs within One Long TTI

For another approach to reduce control overhead, some basic information may be indicated via, e.g. SPS configuration, and fields which have to be changed dynamically may be only indicated dynamically. For example, a set of SPS configurations may be configured. The basic SPS configuration may be indicated by DCI which contains resource configuration and basic MCS. Additionally, a few fields (such as HARQ process number, new data indicator (NDI), etc.) may be dynamically scheduled. This requires a new DCI for short TTI. When a new DCI format is introduced for short TTI, the new DCI format may be monitored only in short TTI intervals or short TTI control regions. In long TTI control regions, the legacy DCI format or existing DCI format may be used. In that sense, basic configuration may be updated only at long TTI control regions, and the delta short DCI may be transmitted only at short TTI control regions.

For utilizing DCI format 1C, DCI format 1c may be applicable only with a certain set of TMs (such as TM 1/2). Or, it may be configured by higher layer to use regardless of TM in short TTI. In general, it may be preferred that that different transmission scheme may have different DCI size.

3. Group-Based First Level DCI+a Data Containing Multiple DCIs+Remaining DCI Fields Embedded in Data.

Field in DCI may be divided into two categories, one of which is necessary for data decoding (e.g. resource allocation, MCS, etc.) and the other is not necessary for data decoding itself (e.g. NDI, HARQ, etc.). The first level DCI may first schedule a data which contains a set of DCI fields necessary for data decoding for multiple UEs, and the remaining fields may be embedded in data. The first level DCI may be scrambled and/or may be attached with CRC based on group ID, which may be higher layer configured to different UEs. The data scheduled by the first level DCI may contain a series of DCI fields for multiple UEs. Each field may contain UE ID. The UE ID may be defined separately from C-RNTI to reduce size of DCI. The UE ID may be assigned within the group ID. For example, C-RNTI may be (group ID*M+UE ID) within a group where M is the maximum group size. The first level DCI may schedule the resource allocation of the DCIs of the group. Based on the DCIs embedded in the first level data, second level data may be decoded, and after decoding second level data, remaining DCI fields may be recovered, and used for HARQ process.

4. Multi-TTI Scheduling.

Another approach to reduce control overhead is to use multiple-subframe/TTI scheduling. If the same scheduling is used, it may include the number of TTIs where the same DCI is applied.

Figure 6:
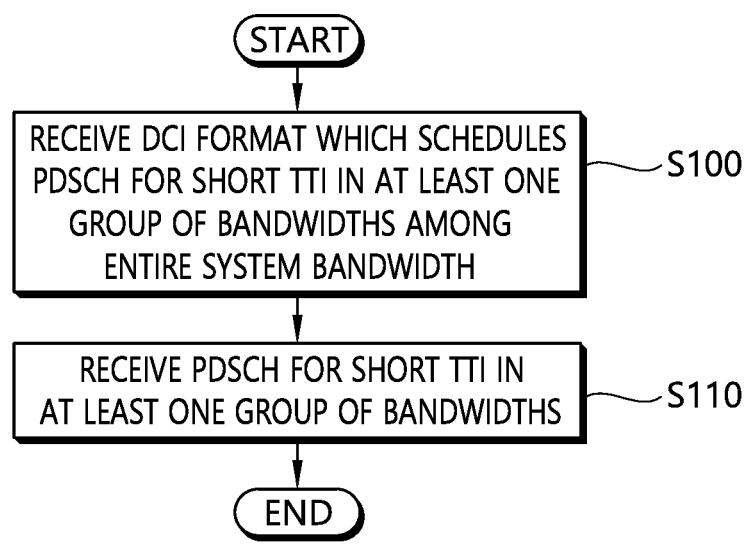
FIG. 6 shows a method for receiving a PDSCH for a short TTI by a UE according to an embodiment of the present invention.

FIG. 6 shows a method for receiving a PDSCH for a short TTI by a UE according to an embodiment of the present invention. The above description according to the present invention may be applied to this embodiment. A length of the short TTI is less than 1 ms.

In step S100, the UE receives a DCI format, which schedules the PDSCH for the short TTI in at least one group of bandwidths among an entire system bandwidth, from an eNB. The at least one group of bandwidths may be indicated by the DCI format or system information. Or, the at least one group of bandwidths may be determined based on a UE ID, a C-RNTI or a scrambling code. The DCI format may corresponds to DCI format 1C. The entire system bandwidth may be divided into a plurality of groups of bandwidth including the at least one group of bandwidths. The plurality of groups of bandwidths may be contiguous or non-contiguous. A number of the plurality of groups of bandwidths may be indicated by the eNB. The number of the plurality of groups of bandwidths may be indicated by different EPDCCH sets. Or, the number of the plurality of groups of bandwidths may be indicated by a candidate index in which the DCI is received.

In step S110, the UE receives the PDSCH for the short TTI in the at least one group of bandwidth from the eNB.

Figure 7:
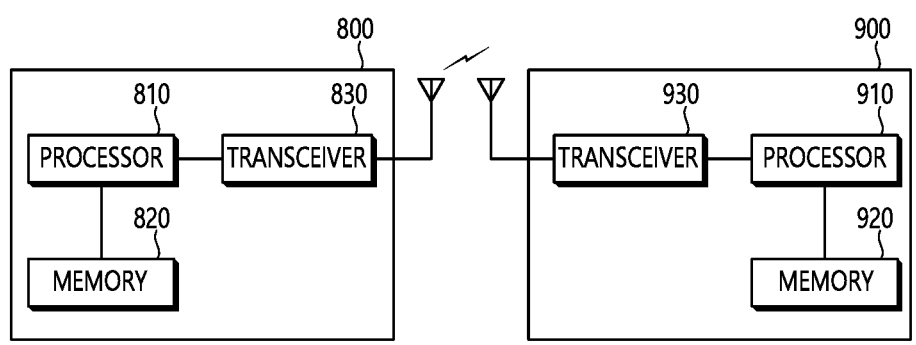
FIG. 7 shows a wireless communication system to implement an embodiment of the present invention.

FIG. 7 shows a wireless communication system to implement an embodiment of the present invention.

An eNB 800 may include a processor 810, a memory 820 and a transceiver 830. The processor 810 may be configured to implement proposed functions, procedures and/or methods described in this description. Layers of the radio interface protocol may be implemented in the processor 810. The memory 820 is operatively coupled with the processor 810 and stores a variety of information to operate the processor 810. The transceiver 830 is operatively coupled with the processor 810, and transmits and/or receives a radio signal.

A UE 900 may include a processor 910, a memory 920 and a transceiver 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The transceiver 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The transceivers 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What is claimed is:

1. A method for receiving a physical downlink shared channel (PDSCH), the method performed by a user equipment (UE) in a wireless communication system, the method comprising:

receiving, by the UE, downlink control information (DCI) based on a first DCI format from an eNodeB (eNB), wherein the DCI based on the first DCI format includes scheduling information related to the PDSCH for a short transmission time interval (TTI), which is scheduled in at least one group of bandwidths among an entire system bandwidth, wherein the DCI based on the first DCI format is received in a time duration configured for the short TTI, and wherein DCI based on a DCI format other than the first DCI format is not received in the time duration configured for the short TTI; and receiving, by the UE, the PDSCH for the short TTI in the at least one group of bandwidths based on the DCI based on the first DCI format, from the eNB, wherein Multiple Input Multiple Output (MIMO) is not used for the receiving of the PDSCH for the short TTI, based on that the DCI based on the first DCI format is received, and wherein a length of the short TTI is less than 1 ms.

2. The method of claim 1, wherein the UE is informed of the at least one group of bandwidths by the first DCI format or system information.

3. The method of claim 1, wherein the at least one group of bandwidths is determined based on a UE ID of the UE, wherein the UE ID of the UE is defined based on a group ID of a UE group, which includes the UE, and wherein the UE ID is defined separately from a cell radio network temporary identifier (C-RNTI).

4. The method of claim 1, wherein the first DCI format is DCI format 1C.

5. The method of claim 1, wherein the entire system bandwidth is divided into a plurality of bandwidth groups including the at least one group of bandwidths.

6. The method of claim 5, wherein the plurality of bandwidth groups are contiguous.

7. The method of claim 5, wherein the UE is informed of the number of bandwidth groups by the eNB.

8. The method of claim 5, wherein the UE is informed of the number of bandwidth groups by different enhanced physical downlink control channel (EPDCCH) sets.

9. The method of claim 5, wherein the UE is informed of the number of bandwidth groups by a candidate index in which the DCI is received.

10. The method of claim 5, wherein the plurality of bandwidth groups are non-contiguous.

11. A user equipment (UE) in a wireless communication system, the UE comprising:
   a memory;
   a transceiver; and
   a processor, operatively coupled to the memory and the transceiver,
   wherein the processor is configured to:
      control the transceiver to receive downlink control information (DCI) based on a first DCI format,
      wherein the DCI based on the first DCI format includes scheduling information related to the PDSCH for a short transmission time interval (TTI), which is scheduled in at least one group of bandwidths among an entire system bandwidth,
      wherein the DCI based on the first DCI format is received in a time duration configured for the short TTI, and
      wherein DCI based on a DCI format other than the first DCI format is not received in the time duration configured for the short TTI; and
      control the transceiver to receive the PDSCH for the short TTI in the at least one group of bandwidths based on the DCI based on the first DCI format, from the eNB,
      wherein Multiple Input Multiple Output (MIMO) is not used for the receiving of the PDSCH for the short TTI, based on that the DCI based on the first DCI format is received, and
      wherein a length of the short TTI is less than 1 ms.

12. The UE of claim 11, wherein the UE is informed of the at least one group of bandwidths by the first DCI format or system information.

13. The UE of claim 11, wherein the at least one group of bandwidths is determined based on a UE ID of the UE,
   wherein the UE ID of the UE is defined based on a group ID of a UE group, which includes the UE, and
   wherein the UE ID is defined separately from a cell radio network temporary identifier (C-RNTI).

14. The UE of claim 11, wherein the first DCI format is DCI format 1C.

15. The UE of claim 11, wherein the entire system bandwidth is divided into a plurality of bandwidth groups including the at least one group of bandwidths.

16. The UE of claim 15, wherein the plurality of bandwidth groups are contiguous.

17. The UE of claim 15, wherein the plurality of bandwidth groups are non-contiguous.

18. The UE of claim 15, wherein the UE is informed of the number of bandwidth groups by the eNB.

19. The UE of claim 15, wherein the UE is informed of the number of bandwidth groups by different enhanced physical downlink control channel (EPDCCH) sets.

20. The UE of claim 15, wherein the UE is informed of the number of bandwidth groups by a candidate index in which the DCI is received.

* * * * *